(No Model.) 2 Sheets—Sheet 1.
J. J. SCHOLFIELD.
SPLIT WHEEL.
No. 470,953. Patented Mar. 15, 1892.
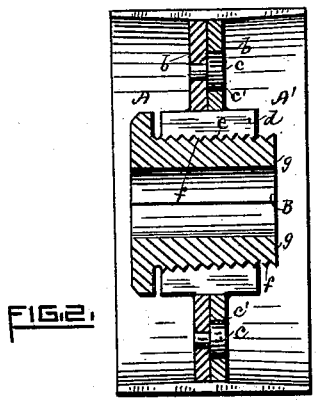
FIG.2.
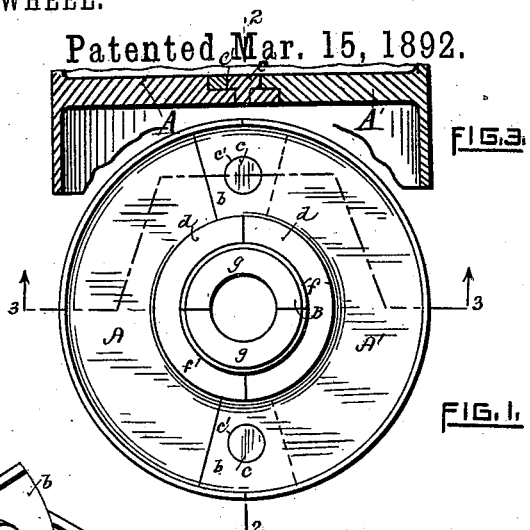
FIG.3.
FIG.1.
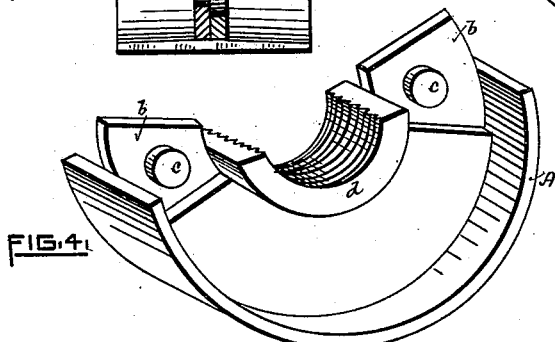
FIG.4.
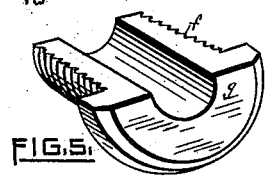
FIG.5.
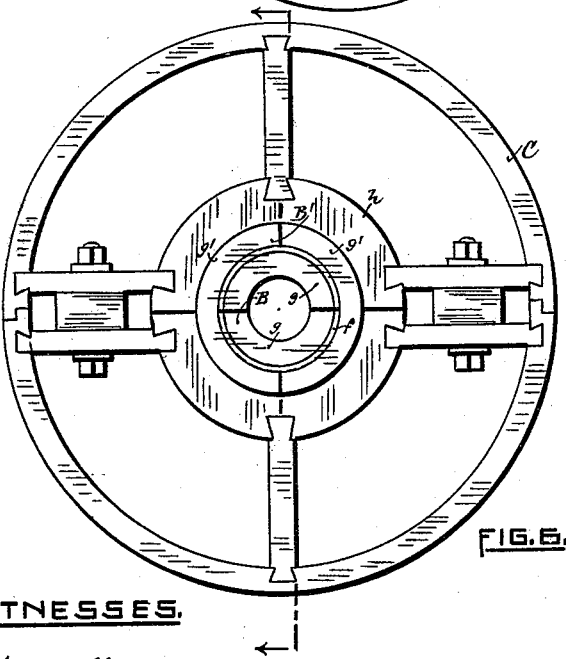
FIG.6.
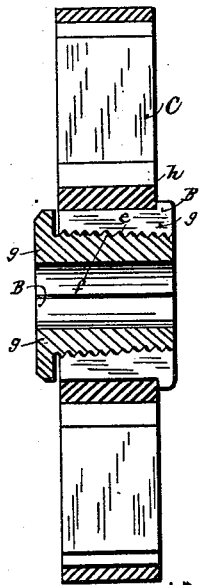
FIG.7.
WITNESSES.
Charles F. Schmelz
James W. Brumm
INVENTOR.
Joseph J. Scholfield
per S. Scholfield
Attorney
THE NORRIS PETERS CO., PHOTO-LITHO., WASHINGTON, D. C.

(No Model.) 2 Sheets—Sheet 2.

J. J. SCHOLFIELD.
SPLIT WHEEL.

No. 470,953. Patented Mar. 15, 1892.

WITNESSES,

Charles F. Schmitz

James W. Newmore

INVENTOR,

Joseph J. Scholfield per S. Scholfield
attorney

THE NORRIS PETERS CO., PHOTO-LITHO., WASHINGTON, D. C.

UNITED STATES PATENT OFFICE.

JOSEPH J. SCHOLFIELD, OF PROVIDENCE, RHODE ISLAND.

SPLIT WHEEL.

SPECIFICATION forming part of Letters Patent No. 470,953, dated March 15, 1892.

Application filed January 15, 1892. Serial No. 418,200. (No model.)

*To all whom it may concern:*

Be it known that I, JOSEPH J. SCHOLFIELD, a citizen of the United States, residing at Providence, in the State of Rhode Island, have invented a new and useful Improvement in Split Pulleys or Wheels, of which the following is a specification.

The nature of my invention consists in the improved construction of the split pulley or wheel, whereby the wheel may be readily secured upon a continously-running shaft, thus obviating the necessity for stopping the factory, as usual, to place a pulley or other wheel in position upon the shaft, or whereby the wheel may be readily secured to a shaft in a machine without necessitating the removal of the shaft from its bearings.

Figure 8:
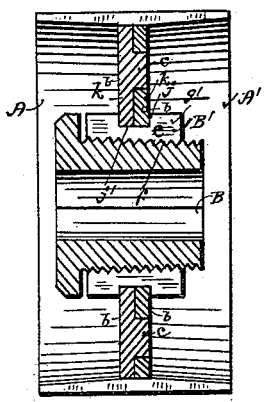
Figure 9:
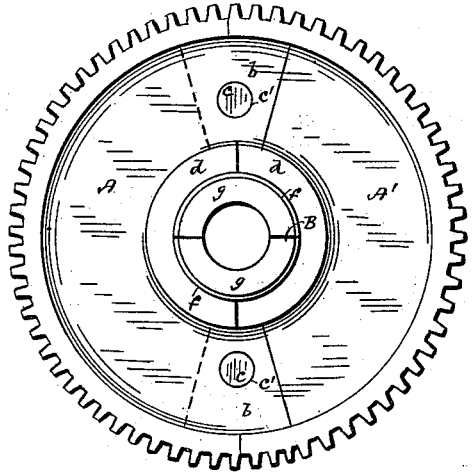
Figure 10:
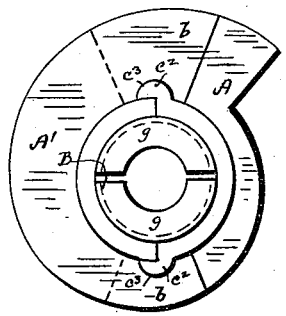
Figure 11:
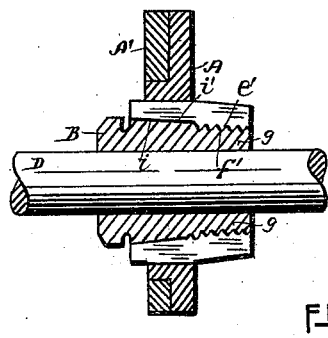

Figure 1 represents a side elevation of a split pulley embodying my improvement. Fig. 2 represents an axial section of the same, taken in the line 2 2 of Fig. 1. Fig. 3 represents a partial section taken in the line 3 3 of Fig. 1. Figs. 4 and 5 represent perspective views of portions of the pulley shown in Fig. 1. Fig. 6 represents a side elevation of a wooden split pulley provided with my improvement. Fig. 7 represents an axial section of the same. Fig. 8 represents an axial section of the split pulley shown in Fig. 1 when the said pulley is constructed with the outer split bushing, as in Figs. 6 and 7. Fig. 9 represents a side view of a gear-wheel embodying my improvement. Fig. 10 represents a side view of a cam-wheel, also embodying my improvement. Fig. 11 represents a vertical section of the same, showing a modification in the construction of the split bushing.

In the accompanying drawings, A, Figs. 1, 2, and 3, represents one semicircular section or segment of a split pulley, and A' the opposite segment, each segment being provided with the opposite lips $b$ $b$, as shown in Fig. 4, by means of which the two segments may be connected together, the lips $b$ $b$ of one segment being provided with the studs $c$ $c$, which enter corresponding perforations $c'$ $c'$, made in the lips $b$ $b$ of the opposite segment. The semi-hubs $d$ $d$ of the segments A A' are provided with an internal screw-thread $e$, which is adapted to fit the tapered external screw-thread $f$ of the parts $g$ $g$ of the split bushing B, which embraces the shaft. Whenever it is desired to attach the pulley to a running shaft, the parts $g$ $g$ of the split screw-threaded bushing B are placed in proper position at opposite sides of the shaft and the two segments A A' of the pulley connected to each other over the shaft by properly interlocking the lips $b$ $b$, so that the studs $c$ $c$ of one side will enter the holes $c'$ $c'$ of the opposite side. The united segments A A' are then to be screwed onto the split bushing B until the parts $g$ $g$ of the same are made to bind upon the shaft, thus holding the pulley tightly in place, and when the belt is placed upon the pulley the greater the strain upon the belt the greater will be the pressure of the parts $g$ $g$ against the sides of the shaft to prevent the pulley from slipping upon the same, the pulley being so arranged that the strain upon the periphery of the same will serve to screw the segments A A' the tighter upon the tapering split bushing B, and the screw-threads of the split bushing B will serve to prevent the lateral unlocking movement of the segments A A', thus rendering the employment of screw-bolts for that purpose unnecessary.

The wooden split pulley C (shown in Fig. 6) is represented as having its wooden hub $h$ provided with a metallic split bushing B', the parts $g'$ $g'$ of which are provided with an interior screw-thread $e$, as are the segments A A' of the pulley shown in Fig. 1, so that the parts $g'$ $g'$ of the split bushing B' will be firmly held in the hub $h$ of the wooden pulley and the parts $g$ $g$ of the tapering split bushing B will be pressed against the sides of the shaft, as before described, thus holding the pulley firmly upon its shaft.

The application of an outer split bushing B' to the pulley shown in Fig. 1 is shown in Fig. 8, in which the segments A A' are made without the semi-hubs $d$ $d$, the outer split bushing B taking the place of the said hubs, and in this case the parts $g'$ $g'$ are each provided with an outer groove $j$, which fits a corresponding recess $j'$ made in the web $k$ of the segments A A', one of the parts $g'$ being made to fit into the recess of the segment A and the other into the recess of the segment A', and the outer and inner split bushings being provided with engaging screw-threads $e$ and $f$, as in the case of the pulley shown in Figs. 6 and 7, before described.

The application of my improvement to a gear-wheel is shown in Fig. 9, in which the screw-threaded exterior segments A A' and the corresponding screw-threaded parts $g$ $g$ of the split bushing are constructed, as before described, for the pulley, Fig. 1.

The application of my improvement to a cam-wheel is shown in Figs. 10 and 11, in which the exterior parts are held together by means of the opposite semicircular lugs $c^2$ $c^2$ upon the segmental section A, which enter the corresponding recesses $c^3$ $c^3$ in the opposite lips $b$ $b$ of the segmental section A', and the split bushing B, instead of being provided with a tapering screw-thread adapted to fit a correspondingly-tapered interior thread made in the sections A A', is made in tapering form to fit the tapering bore of the said sections, a screw-thread $f'$ being provided upon the end of the parts $g$ $g$ of the split bushing to fit the internal screw-thread $e'$ of the sections A A', so that upon screwing the said sections upon the bushing the sliding contact of the longitudinally-tapering surfaces $i$ $i'$ will cause the parts $g$ $g$ to press tightly upon the shaft D, and in order to properly form the tapering surface of the parts $g$ $g$ of the split bushing the two parts are first bored out for the size of the shaft, with a packing of paper or other material between them and the screw-thread $f'$ cut thereon. The packing is then removed and the parts brought together without the packing and the exterior turned off in conical form, thus forming a tapering surface $i$, which by sliding along the conical surface $i'$ of the segmental sections A A' will serve to cause the parts $g$ $g$ to press firmly against the opposite sides of the shaft to hold the cam-wheel in position. It is, however, to be understood that when it is not required to grip the shaft D tightly the sides of the parts $g$ $g$ of the bushing B may be made straight instead of tapering.

The outer split bushing B', (shown in Fig. 8,) provided with the outer groove $j$, which fits the corresponding recess $j'$ made in the web $k$ of the segments A A' and provided with an internal screw-thread, having been embraced in a general claim in this specification, and having been shown, described, and specifically claimed in my pending application, Serial No. 415,042, filed December 14, 1891, the same is therefore not specifically claimed in this specification.

I claim as my invention—

1. The combination, with the wheel-segments interlocked with each other and provided with an interior screw-thread, of a split bushing provided with an exterior screw-thread, which will serve to secure the said segments against a lateral unlocking movement, substantially as described.

2. The combination, with the wheel-segments interlocked with each other and provided with an interior screw-thread, of a tapering split bushing provided with an exterior screw-thread, which will serve to secure the said interlocked segments against a lateral unlocking movement, substantially as described.

3. The combination, with wheel-segments suitably secured to each other, of an outer split bushing provided with an interior screw-thread and an inner split bushing adapted to fit the screw-thread of the outer split bushing and to secure the said segments and outer bushing to the shaft, substantially as described.

JOSEPH J. SCHOLFIELD.

Witnesses:
SOCRATES SCHOLFIELD,
HENRY McELROY.